United States Patent
Wang et al.

(10) Patent No.: US 9,369,071 B2
(45) Date of Patent: Jun. 14, 2016

(54) DISCONTINUOUS PULSE WIDTH MODULATION

(71) Applicant: Ford Global Technologies, LLC, Dearborn, MI (US)

(72) Inventors: Chang-Jiang Wang, Troy, MI (US); Michael W. Degner, Novi, MI (US); William Reynolds, Tecumseh (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/185,274

(22) Filed: Feb. 20, 2014

(65) Prior Publication Data

US 2015/0236628 A1 Aug. 20, 2015

(51) Int. Cl.
| | |
|---|---|
| *H02P 1/00* | (2006.01) |
| *H02P 6/18* | (2016.01) |
| *H02P 27/08* | (2006.01) |
| *H02M 7/5395* | (2006.01) |
| *B60W 10/08* | (2006.01) |
| *B60W 20/00* | (2016.01) |
| *H02M 7/5387* | (2007.01) |

(52) U.S. Cl.
CPC ............. *H02P 6/182* (2013.01); *H02M 7/5395* (2013.01); *H02P 27/08* (2013.01); *B60W 10/08* (2013.01); *B60W 20/00* (2013.01); *H02M 2007/53876* (2013.01); *Y02T 10/70* (2013.01); *Y02T 10/7005* (2013.01); *Y02T 10/7077* (2013.01)

(58) Field of Classification Search
CPC . Y02T 10/7005; Y02T 10/7077; Y02T 10/70; B60W 10/08; B60W 20/00
USPC ........................................................ 318/139
See application file for complete search history.

(56) References Cited

U.S. PATENT DOCUMENTS

| | | | | |
|---|---|---|---|---|
| 7,432,683 | B2 * | 10/2008 | Welchko | ........... H02M 7/53875 318/801 |
| 7,518,335 | B2 * | 4/2009 | West | ....................... H02P 27/08 318/810 |
| 2009/0107742 | A1 * | 4/2009 | Schulz | ................... B60K 6/445 180/65.7 |
| 2010/0066283 | A1 * | 3/2010 | Kitanaka | ............. B60L 11/1803 318/400.02 |
| 2011/0068727 | A1 * | 3/2011 | Welchko | ............ G05B 23/0235 318/490 |
| 2012/0075892 | A1 | 3/2012 | Tallam et al. | |

OTHER PUBLICATIONS

Ojo et al., Industrial Electronics, IEEE Transactions, Dec. 2004, vol. 51, Issue 6, 8 pages, "The Generalized Discontinuous PWM Modulation Scheme for Three-Phase Voltage Source Inverters."

* cited by examiner

*Primary Examiner* — Shawki S Ismail
*Assistant Examiner* — Bradley Brown
(74) *Attorney, Agent, or Firm* — David B. Kelley; Brooks Kushman P.C.

(57) ABSTRACT

A discontinuous pulse width modulation technique is used in a controller to control an inverter that converts DC battery power to AC power to operate an electric motor, e.g., in a hybrid electric vehicle. The discontinuous pulse width modulation technique uses only one of the two zero state voltage vectors in its calculations whereas traditional pulse width modulation uses both zero state voltage vectors. The use of a single zero state voltage vector can result in one of a group of switches in the inverter remaining in a constant state during a complete duty cycle while still providing the commanded voltage vector to the electrical motor. As a result losses due to switching can be reduced.

20 Claims, 8 Drawing Sheets

DISCONTINUOUS PULSE WIDTH MODULATION

TECHNICAL FIELD

Various embodiments relate to an electrified vehicle and a method for controlling operation of the inverter to power the electric motor.

BACKGROUND

Hybrid electric vehicles (HEV's) utilize a combination of an internal combustion engine with an electric motor to provide the power or the torque needed to propel a vehicle. This arrangement provides improved fuel economy over a vehicle that has only an internal combustion engine. Electrical energy is stored in batteries in direct current (DC). However, the electrical motor uses alternating current (AC) to provide torque to propel the vehicle. The DC current must be converted to AC current to power the electric motor by the battery, such a conversion uses switches to convert to AC current and this results in switching losses.

SUMMARY

Pulse width modulation can provide control signals to switches in an inverter to convert DC electrical energy from a battery into AC electrical energy for use in an electrical motor. Control signals control the state of the switches in an inverter. These control signals can be calculated using active voltage vectors and zero voltage vectors. In an example, a single zero vector is used in calculating the control signals for the inverter. The control signals can be calculated using a technique that holds at least one switch of a group of switches at a constant value. This can reduce switching losses.

In an example, a discontinuous pulse width modulation method includes determining an angle of the commanded vector; calculating, on a sector basis, first duty cycles of two active vectors and a single zero vector; calculate control signals for an upper group of inverter switches and a lower group of inverter switches using the first duty cycles; and outputting the control signals to an inverter with at least one control signal being constant for the sector.

In an example, pulse width modulation method may include holding one of the control signals for the upper group of inverter switches constant and/or holding one of the control signals for the lower group of inverter switches constant.

In an example, pulse width modulation method may include alternating the single zero vector on a sector basis.

In an example, pulse width modulation method may include selecting the single zero vector from two zero vectors. In an example, pulse width modulation method may include using a first of the two zero vectors in calculating in a first sector for the upper group of inverter switches and the second of the two zero vectors in calculating in the first sector for the lower group of inverter switches.

In an example, pulse width modulation method may include holding one of the control signals for the upper group of inverter switches constant and holding one of the control signals for the lower group of inverter switches constant.

In an example, a discontinuous pulse width modulation method includes calculating control signals for a target voltage using two, adjacent active vectors and a single zero vector that is associated with the two active vectors, and alternating the single zero vector for calculating the target voltage for subsequent adjacent active vectors. The target voltage is the electrical signal to drive the electric motor. The discontinuous pulse width modulation can further include calculating a first active vector duty cycle for a first of the two, adjacent active vectors, calculating a second active vector duty cycle for a second of the two, adjacent active vectors, calculating a single zero vector duty cycle for the single zero vector, and converting the first active vector duty cycle, the second active vector duty cycle and the zero vector duty cycle to control the duty cycles of three upper switches of the inverter, respectively. The discontinuous pulse width modulation method may also include calculating a third active vector duty cycle for the first adjacent active vector, calculating a fourth active vector duty cycle for the second active vector, calculating a single, second zero vector duty cycle for a, second single zero vector, and converting the third active vector duty cycle, the fourth active vector duty cycle and the second zero vector duty cycle to control the duty cycles of three lower switches of the inverter, respectively.

In an example, a method for controlling a hybrid vehicle can be performed using the above examples.

In an example, a hybrid electrical vehicle can include a battery, an electrical motor to be powered by the battery; inverter circuitry to convert a DC signal of the battery to an AC signal of the electric motor, the inverter circuitry including three legs each having two series connected switches and a common node connected to the electrical motor, and a controller to control a state of the inverter circuitry. In an example, the controller uses a single zero vector and two adjacent, active voltage vectors to compute a command voltage vector between the two adjacent, active voltage vectors. In an example, the inverter circuitry structure results in a six sector voltage vector plane with six active voltage vectors ($\vec{V}_1, \vec{V}_2, \vec{V}_3, \vec{V}_4, \vec{V}_5, \vec{V}_6$) defining the six sectors and two zero voltage vectors ($\vec{V}_0, \vec{V}_7$). In an example, at least one switch in each leg is held at a constant state for calculations in each sector to reduce switching losses.

In an example, the controller calculates the angle of the command voltage vector $\theta_a$ relative to the active voltage vector of a sector using:

$$\theta_a = \theta_r + \theta_s^* - \frac{\pi}{2} - (ID_{sector} - 1)\frac{\pi}{3}.$$

In an example, the controller calculates internal duty cycle variables using:

$$\sigma_1 = \frac{2\sqrt{3}}{\pi} M_{index} \sin\left(\frac{\pi}{3} - \theta_a\right)$$

$$\sigma_2 = \frac{2\sqrt{3}}{\pi} M_{index} \sin\theta_a$$

$$\sigma_0 = 1 - \sigma_1 - \sigma_2.$$

In an example, the controller calculates the inverter switch control signals from $\sigma_1$, $\sigma_2$, and $\sigma_0$.

In an example, the controller outputs a control signal to the switches of the inverter and at least one control signal is equal to one of $\sigma_1$, $\sigma_2$, and $\sigma_0$.

DETAILED DESCRIPTION

The present document details embodiments of the present invention herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
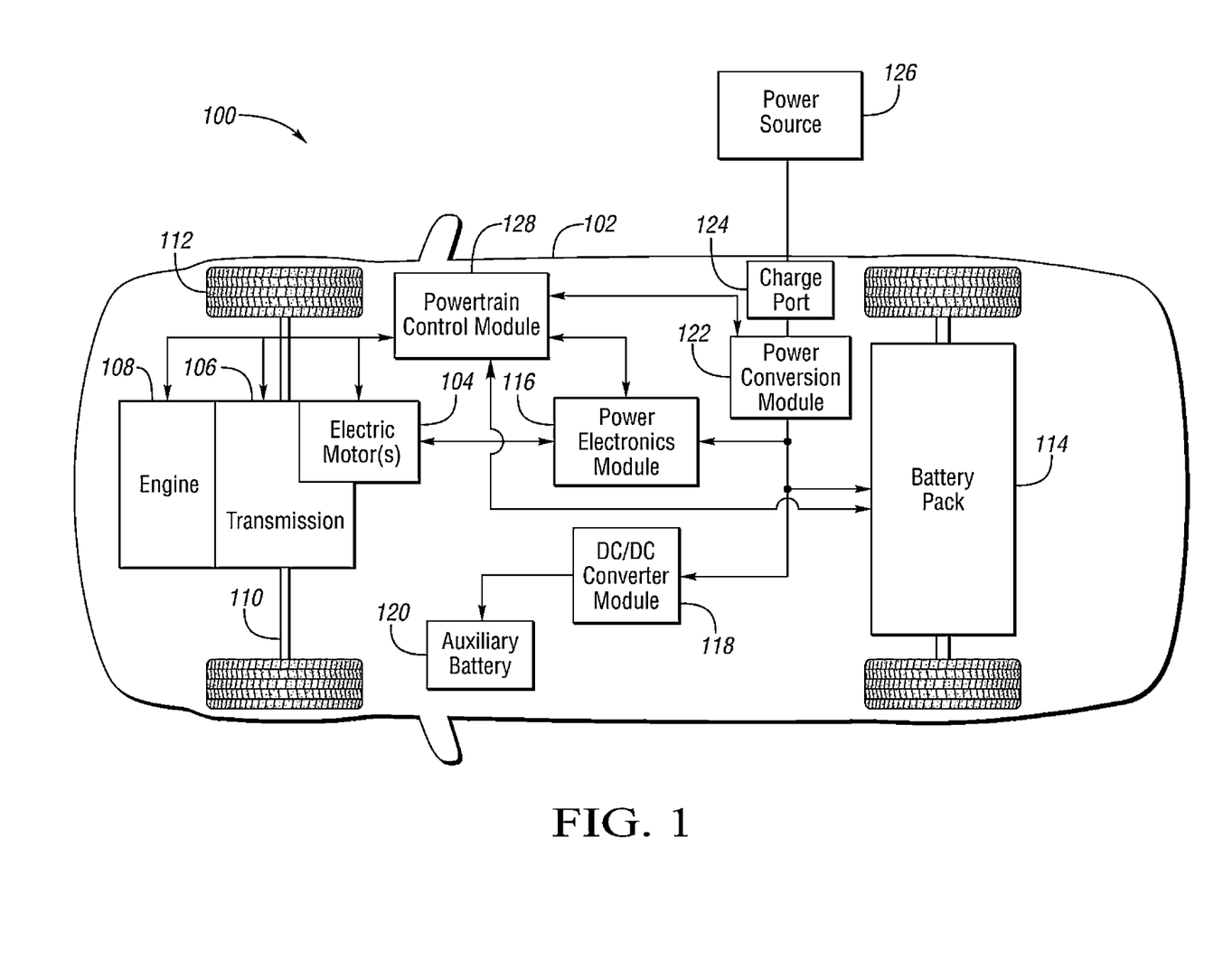
FIG. 1 is an example hybrid-electric vehicle with a battery pack.

FIG. 1 depicts an example of an electric vehicle, e.g., a plug-in hybrid electric vehicle. A plug-in hybrid-electric vehicle 102 may comprise one or more electric motors 104 mechanically connected to a hybrid transmission 106. In addition, the hybrid transmission 106 is mechanically connected to an engine 108, for example an internal combustion engine. The hybrid transmission 106 may also be mechanically connected to a drive shaft 110 that is mechanically connected to the wheels 112. The electric motors 104 can provide propulsion when the engine 108 is turned on. The electric motors 104 can provide deceleration capability when the engine 108 is turned off. The electric motors 104 may be configured as generators and can provide fuel economy benefits by recovering energy that would normally be lost as heat in the friction braking system. The electric motors 104 may also reduce pollutant emissions since the hybrid electric vehicle 102 may be operated in electric mode under certain conditions.

The traction battery or battery pack 114 stores energy that can be used by the electric motors 104. A vehicle battery pack 114 typically provides a high voltage DC output. The battery pack 114 is electrically connected to a power electronics module 116. The power electronics module 116 is also electrically connected to the electric motors 104 and provides the ability to bi-directionally transfer energy between the battery pack 114 and the electric motors 104. For example, a battery pack 114 may provide a DC voltage while the electric motors 104 may require a three-phase AC current to function. The power electronics module 116 may convert the DC voltage to a three-phase AC current as required by the electric motors 104, for example, by using an inverter module. In a regenerative mode, the power electronics module 116 will convert the three-phase AC current from the electric motors 104 acting as generators to the DC voltage required by the battery pack 114, also using an inverter module or other circuitry. The methods described herein are equally applicable to a pure electric vehicle or any other device or vehicle using a battery pack.

In addition to providing energy for propulsion, the battery pack 114 may provide energy for other vehicle electrical systems. Such a system may include a DC/DC converter module 118 that converts the high voltage DC output of the battery pack 114 to a low voltage DC supply that is compatible with other vehicle loads. Other high voltage loads, such as compressors and electric heaters, may be connected directly to the high-voltage bus from the battery pack 114. In a vehicle, the low voltage systems may be electrically connected to a 12V battery 120. An all-electric vehicle may have a similar architecture but without the engine 108.

The battery pack 114 may be recharged by an external power source 126. The external power source 126 may provide AC or DC power to the vehicle 102 by electrically connecting through a charge port 124. The charge port 124 may be any type of port configured to transfer power from the external power source 126 to the vehicle 102. The charge port 124 may be electrically connected to a power conversion module 122. The power conversion module may condition the power from the external power source 126 to provide the proper voltage and current levels to the battery pack 114. In some applications, the external power source 126 may be configured to provide the proper voltage and current levels to the battery pack 114 and the power conversion module 122 may not be necessary. The functions of the power conversion module 122 may reside in the external power source 126 in some applications. The vehicle engine, transmission, electric motors, battery, power conversion and power electronics may be controlled by a powertrain control module (PCM) 128.

In addition to illustrating a plug-in hybrid vehicle, FIG. 1 can illustrate a battery electric vehicle (BEV) if engine 108 is removed. Likewise, FIG. 1 can illustrate a traditional hybrid electric vehicle (HEV) or a power-split hybrid electric vehicle if components 122, 124, and 126 are removed. FIG. 1 also illustrates the high voltage system which includes the electric motor(s), the power electronics module 116, the DC/DC converter module 118, the power conversion module 122, and the battery pack 114. The high voltage system and battery pack includes high voltage components including bus bars, high voltage connectors, high voltage wires, and circuit interrupt devices.

Figure 2:
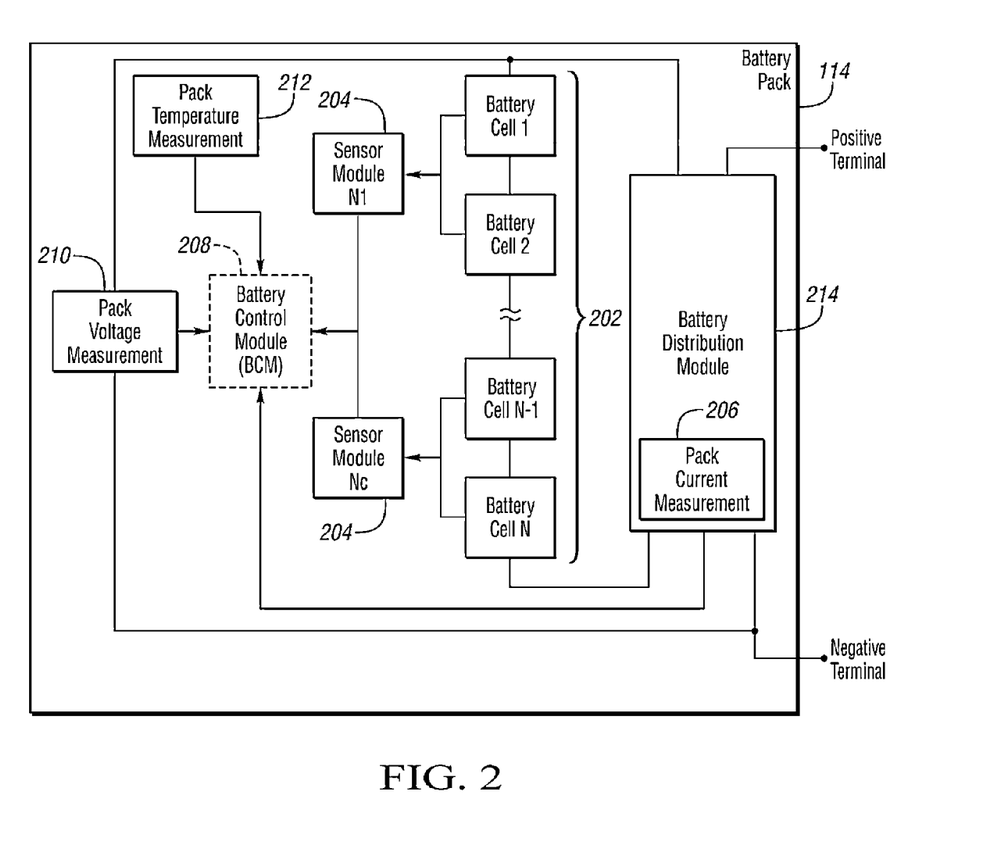
FIG. 2 is a battery pack arrangement comprised of battery cells and battery cell monitoring and controlling systems.

The individual battery cells within a battery pack can be constructed from a variety of chemical formulations. Battery pack chemistries may include, but are not limited, to lead acid, nickel cadmium (NiCd), nickel-metal hydride (NIMH), Lithium-Ion or Lithium-Ion polymer. FIG. 2 shows a battery pack 200 in a simple series configuration of N battery cell modules 202. The battery cell modules 202 may contain a single battery cell or multiple battery cells electrically connected in parallel. The battery pack, however, may be composed of any number of individual battery cells and battery cell modules connected in series or parallel or some combination thereof. A system may have one or more controllers, such as a Battery Control Module (BCM) 208 that monitors and controls the performance of the battery pack 200. The BCM 208 may monitor several battery pack level characteristics such as pack current measured by a current sensor 206, pack voltage 210 and pack temperature 212. The performance of the current sensor 206 may be essential, in certain arrangements, to build a reliable battery monitoring system. The accuracy of the current sensor may be useful to estimate the battery state of charge and capacity. A current sensor may utilize a variety of methods based on physical principles to detect the current including a Hall effect IC sensor, a transformer or current clamp, a resistor in which the voltage is directly proportional to the current through it, fiber optics using an interferometer to measure the phase change in the light produced by a magnetic field, or a Rogowski coil. In the event a battery cell is charging or discharging such that the current entering or exiting the battery cell exceeds a threshold, the battery control module may disconnect the battery cell via the use of a circuit interrupt device (CID) such as a fuse or circuit breaker.

In addition to the pack level characteristics, there may be battery cell level characteristics that need to be measured and monitored. For example, the terminal voltage, current, and temperature of each cell or a representative subset of cells may be measured. A system may use a sensor module 204 to measure the characteristics of one or more battery cell modules 202. The characteristics may include battery cell voltage, temperature, age, number of charge/discharge cycles, etc. In an example, a sensor module will measure battery cell voltage. Battery cell voltage may be voltage of a single battery or of a group of batteries electrically connected in parallel or in series. The battery pack 114 may utilize up to $N_c$ sensor modules 204 to measure the characteristics of a representative sample or all of the battery cells 202. Each sensor module 204 may transfer the measurements to the BCM 208 for further processing and coordination. The sensor module 204 may transfer signals in analog or digital form to the BCM 208. The battery pack 114 may also contain a battery distribution module (BDM) 214 which controls the flow of current into and out of the battery pack 114.

Figure 3:
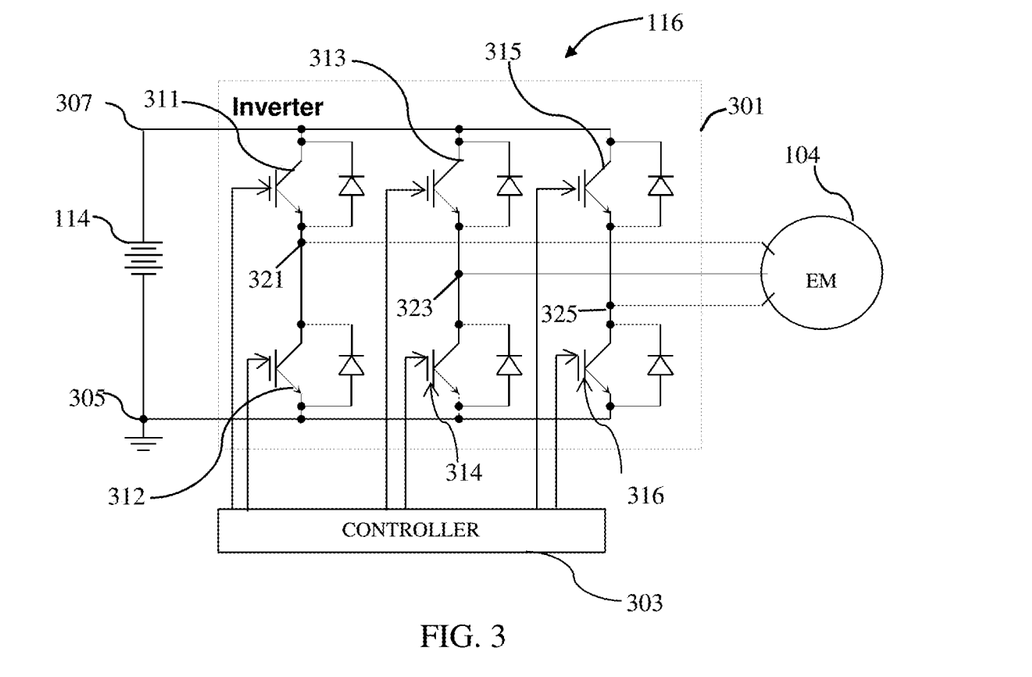
FIG. 3 is an example electrical power transfer arrangement.

FIG. 3 shows a schematic view of the battery 114 connected to an electric motor, e.g., motor 104, through the power electronics module 116. The power electronics module includes an inverter module or circuitry 301 that is controlled by a controller 303. The inverter module 301 is to convert the electrical signal from the battery to a signal that can power the electric motor 104, e.g., DC voltage to a three phase AC signal.

The battery 114 is connected to a low voltage node 305 (e.g., a negative terminal of a battery) and a high voltage node 307 (e.g., a positive terminal of a battery). The low voltage node 305 is shown in the FIG. 3 example as ground. A ground is not necessarily earth potential; a "ground line" need not be electrically connected to the Earth. Rather, ground connotes a node that is maintained at a reference voltage that is substantially constant with respect to other voltages, which can be zero volts or at a non-zero voltage. The node 305 is connected to the low power connection of the inverter 301. The node 307 is connected to the high power connection of the inverter 301.

The inverter 301 includes a plurality of series connected pairs of switches 311-312, 313-314 and 315-316. The switches can be power semiconductor switches, e.g., MOSFET, thyristor, or IGBT technologies. A diode is connected in parallel with each switch to provide reverse current flow. An output node 321, 323, 325 is intermediate each pair of switches 311-312, 313-314 and 315-316, respectively. Each pair of switches can be referred to as a leg of the inverter. Output nodes 321, 323, 325 provide a drive signal for the electric motor 104. The switches 311-316 convert the battery voltage, a DC voltage at inverter supply nodes 305 and 307, into AC voltages at output nodes 321, 323, 325. In operation, the switches on each leg can have opposite states. Accordingly, there are eight states of operation for the inverter. While the switches operate to convert the DC to and AC in a standard switching scheme with all switches being able to turn on and off, e.g., during each sector, the switches introduce losses with each change in state, i.e., on to off and off to on.

Controller 303 is electrically connected to the switches 311-316 to provide control signals to the switch 311-316. By switching the switches between conducting ("on") and non-conducting ("off") states, the inverter 301 provides three phase voltages on the output nodes 321, 323, 325 to control the electric motor 104. The controller 303 receives a target drive signal from other circuitry in the vehicle. The target drive signal is the desired operating state of the electrical motor for providing motive power for the vehicle. Controller 303 uses pulse width modulation calculations to convert the DC from the battery to AC for the motor 104. In an example, the controller uses a digital, discontinuous pulse width modulation technique to calculate the duty cycles (on/off times) for the switches 311-316. As explained herein the use of the discontinuous pulse width modulation technique will improve the efficiency of the inverter, e.g., by reducing switching losses.

Figure 4:
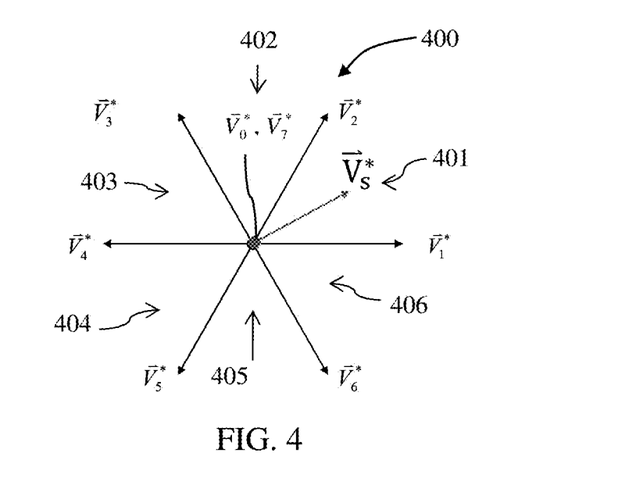
FIG. 4 is a schematic voltage plane for the calculating electrical power control.

FIG. 4 shows a diagram of voltage vectors 400 used by controller 303 or other processor to calculate the control signals for the inverter 301. The controller can calculate using vector space computations. The voltage plane is divided into six sectors 401-406 by six, active voltage vectors $\bar{v}_1^*$, $\bar{v}_2^*$, $\bar{v}_3^*$, $\bar{v}_4^*$, $\bar{v}_5^*$ and $\bar{v}_d^*$. There are also two zero voltage vectors $\bar{v}_0^*$ and $\bar{v}_7^*$. The targeted voltage is depicted as command voltage vector $\bar{v}_s^*$ and in the illustrated example is located in the first sector 401 intermediate the active voltage vectors $\bar{v}_1^*$ and $\bar{v}_2^*$. Accordingly, the active voltage vectors used in calculation of the drive signal by the controller 303 are $\bar{v}_1^*$ and $\bar{v}_2^*$. However, the controller 303 only uses one of the zero voltage vectors in this calculation. Other pulse width modulation techniques use both vectors $\bar{v}_0^*$ and $\bar{v}_7^*$, which results in a greater switching in the inverter and increases losses. When the command voltage vector $\bar{v}_s^*$ is in another sector, e.g., sector 404, then the two adjacent active voltage vectors, i.e., $\bar{v}_4^*$ and $\bar{v}_5^*$, and one zero voltage vector are used to calculate the command voltage vector $\bar{v}_s^*$. The command voltage vector is then used to calculate the control signals for the switches 311-316 of the inverter.

Figure 5A:
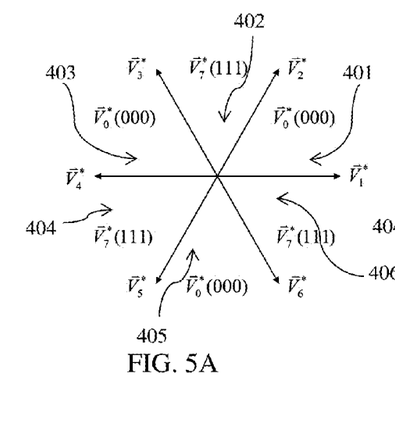
FIGS. 5A and 5B are schematic voltage planes showing the zero voltage vector associated with each sector for calculating control signals for inverter switches.
Figure 5B:
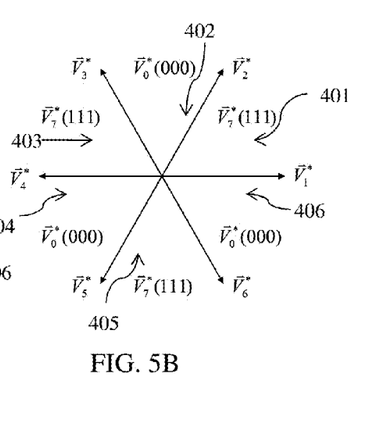

FIGS. 5A and 5B show vector voltage diagrams for the upper switches 311, 313 and 315 and lower switches 312, 314, and 316, respectively. The vector voltage diagrams show an order for selecting the zero voltage vector for each sector for the respective group of upper switches or lower switches. FIG. 5A shows that zero voltage vector $\bar{v}_0^*$ is used in calculations for sectors 401, 403, and 405 for the upper switches and zero voltage vector $\bar{v}_7^*$ is used in calculations for sectors 402, 404, and 406 for the upper switches. FIG. 5B shows that zero voltage vector $\bar{v}_0^*$ is used in calculations for sectors 402, 404, and 406 for the lower switches and zero voltage vector $\bar{v}_7^*$ is used in calculations for sectors 401, 403, and 405 for the lower switches. As further shown in FIGS. 5A and 5B, the zero voltage vectors $\bar{v}_0^*$ and $\bar{v}_7^*$ represent the all "off" state (000) or all "on" state (111) of the eight possible states of the inverter switches. Only one zero voltage vector is used in the controller to calculate the target voltage vector in a sector 401, 403, 405 for the upper switches. The other of the two voltage vectors is used in the same sector for calculating the target voltage vector in the same sector 402, 404, 406 for the lower switches. The controller uses the vectors to calculate vector duty cycles and then converts those vector duty cycles into duty cycles for the switches.

Figure 6A:
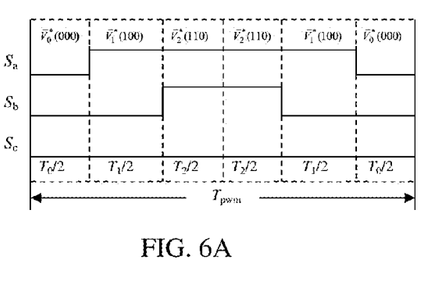
FIGS. 6A and 6B are timing diagrams for controlling inverter upper switches and inverter lower switches, respectively, as calculated for a first sector using a discontinuous pulse width modulation technique according to embodiments described herein.

FIG. 6A shows a timing diagram for the switch duty cycles for the upper switches when the command voltage vector $\bar{v}_s^*$ is in the first sector 401. The entire cycle $T_{pwm}$ is represented by $T_0$, $T_1$ and $T_2$, which are in turn divided in half timing periods $T_0/2$, $T_1/2$ and $T_2/2$ to create six timing intervals that are used in the depicted timing diagrams as shown in FIGS. 6A-11B. However, the order of the times used in calculation may be different for different sectors and whether the calculation is for the upper switches of the lower switches as indicted in FIGS. 6A-11B. The first inverter leg, second inverter leg, third inverter leg, of the inverter, are designated by subscripts "a", "b" and "c", respectively, in FIGS. 6A-11B. The state of the control signal to the upper switch 311 of the first inverter leg is shown at $S_a$. The state of the control signal to the upper switch 313 of the second inverter leg is shown at $S_b$. The state of the control signal to the upper switch 315 of the third inverter leg is shown at $S_c$, which remains at a low state for the entire cycle time $T_{pwm}$. The third leg, upper switch 315 does not change state and, in an example, remains in the off state for the entire cycle time $T_{pwm}$. Accordingly, the inverter is more efficient as it reduces switching losses by not changing the state of inverter switch 315 for the first sector 401 calculated duty cycle of the inverter.

Figure 6B:
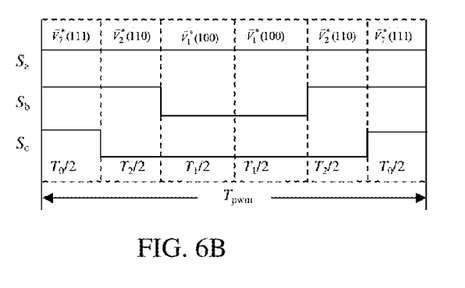

FIG. 6B shows a timing diagram for the switch duty cycles for the inverter lower switches 312, 314, and 316 when the command voltage vector $\bar{v}_s^*$ is in the first sector 401. The state of the control signal to the lower switch 312 of the first inverter leg is shown at $S_a$, which remains at a high state for the entire cycle time $T_{pwm}$. The state of the control signal to the lower switch 314 of the second inverter leg is shown at $S_b$. The state of the control signal to the lower switch 316 of the third inverter leg is shown at $S_c$. As the signal $S_a$ is at a constant high state, the first leg, lower switch 312 remains in a same state (e.g., on) for the entire cycle time $T_{pwm}$. Accordingly, the inverter is more efficient as it does not change state of inverter switch 316 for the first sector 401 calculated duty cycle of the inverter.

Figure 7A:
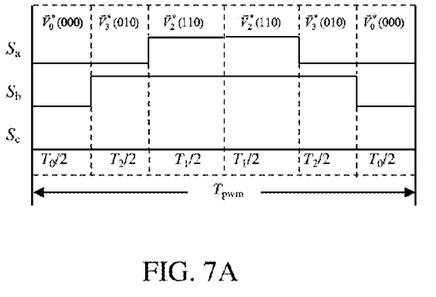
FIGS. 7A and 7B are timing diagrams for controlling inverter upper switches and inverter lower switches, respectively, as calculated for a second sector using a discontinuous pulse width modulation technique according to embodiments described herein.

FIG. 7A shows a timing diagram for the switch duty cycles for the upper switches when the command voltage vector $\bar{v}_s^*$ is in the second sector 402. The state of the control signal to the upper switch 311 of the first inverter leg is shown at $S_a$. The state of the control signal to the upper switch 313 of the second inverter leg is shown at $S_b$. The state of the control signal to the upper switch 315 of the third inverter leg is shown at $S_c$, which remains at a low state for the entire cycle time $T_{pwm}$. As the signal $S_c$ is at a constant low state, the third leg, upper switch 315 remains at a same state (e.g., in the off state) for the entire cycle time $T_{pwm}$. Accordingly, the inverter is more efficient as it does not change state of inverter switch 315 for the second sector 402 calculated duty cycle of the inverter.

Figure 7B:
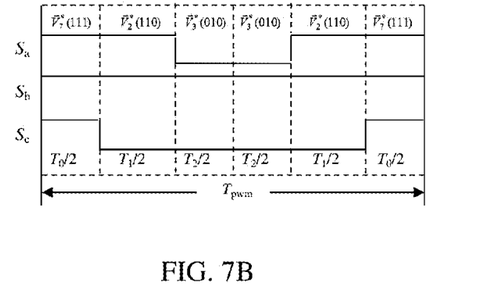

FIG. 7B shows a timing diagram for the switch duty cycles for the inverter lower switches 312, 314, and 316 when the command voltage vector $\bar{v}_s^*$ is in the second sector 402. The state of the control signal to the lower switch 312 of the first inverter leg is shown at $S_a$. The state of the control signal to the lower switch 314 of the second inverter leg is shown at $S_b$, which remains at a high state for the entire cycle time $T_{pwm}$. The state of the control signal to the lower switch 316 of the third inverter leg is shown at $S_c$. As the signal $S_b$ is at a constant high state, the second leg, lower switch 314 remains at a same state, e.g. in the on state, for the entire cycle time $T_{pwm}$. Accordingly, the inverter is more efficient as it does not change state of inverter switch 314 for the second sector 402 calculated duty cycle of the inverter.

Figure 8A:
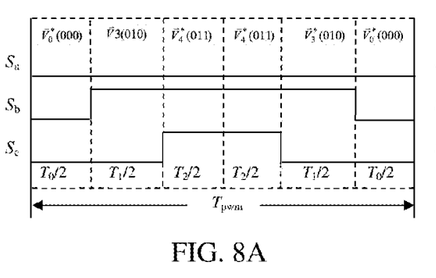
FIGS. 8A and 8B are timing diagrams for controlling inverter upper switches and inverter lower switches, respectively, as calculated for a third sector using a discontinuous pulse width modulation technique according to embodiments described herein.

FIG. 8A shows a timing diagram for the switch duty cycles for the upper switches when the command voltage vector $\bar{v}_s^*$ is in the third sector 403. The state of the control signal to the upper switch 311 of the first inverter leg is shown at $S_a$, which remains at a low state for the entire cycle time $T_{pwm}$. The state of the control signal to the upper switch 313 of the second inverter leg is shown at $S_b$. The state of the control signal to the upper switch 315 of the third inverter leg is shown at $S_c$. As the signal $S_a$ is at a constant low state, the first leg, upper switch 311 remains at a same state (e.g., in the off state) for the entire cycle time $T_{pwm}$. Accordingly, the inverter is more efficient as it does not change state of inverter switch 311 for the third sector 403 calculated duty cycle of the inverter.

Figure 8B:
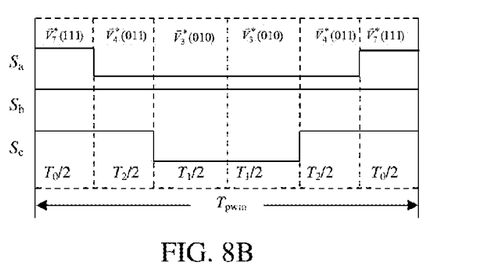

FIG. 8B shows a timing diagram for the switch duty cycles for the inverter lower switches 312, 314, and 316 when the command voltage vector $\bar{v}_s^*$ is in the third sector 403. The state of the control signal to the lower switch 312 of the first inverter leg is shown at $S_a$. The state of the control signal to the lower switch 314 of the second inverter leg is shown at $S_b$, which remains at a high state for the entire cycle time $T_{pwm}$. The state of the control signal to the lower switch 316 of the third inverter leg is shown at $S_c$. As the signal $S_b$ is at a constant high state, the second leg, lower switch 314 remains at a same state, e.g. in the on state, for the entire cycle time $T_{pwm}$. Accordingly, the inverter is more efficient as it does not change state of inverter switch 314 for the third sector 403 calculated duty cycle of the inverter.

Figure 9A:
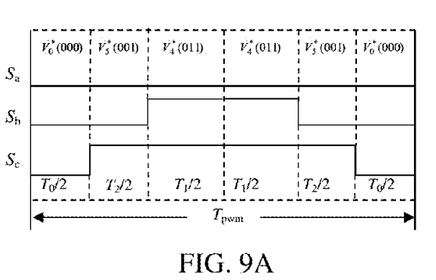
FIGS. 9A and 9B are timing diagrams for controlling inverter upper switches and inverter lower switches, respectively, as calculated for a fourth sector using a discontinuous pulse width modulation technique according to embodiments described herein.

FIG. 9A shows a timing diagram for the switch duty cycles for the upper switches when the command voltage vector $\bar{v}_s^*$ is in the fourth sector 404. The state of the control signal to the upper switch 311 of the first inverter leg is shown at $S_a$, which remains at a low state for the entire cycle time $T_{pwm}$. The state of the control signal to the upper switch 313 of the second inverter leg is shown at $S_b$. The state of the control signal to the upper switch 315 of the third inverter leg is shown at $S_c$. As the signal $S_a$ is at a constant low state, the first leg, upper switch 311 remains at a same state (e.g., in the off state) for the entire cycle time $T_{pwm}$. Accordingly, the inverter is more efficient as it does not change state of inverter switch 311 for the fourth sector 404 calculated duty cycle of the inverter.

Figure 9B:
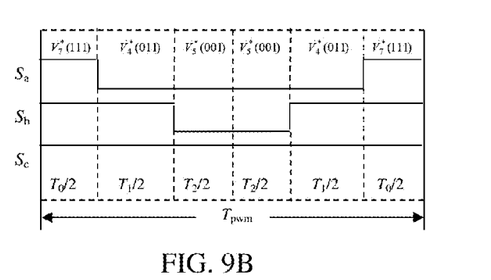

FIG. 9B shows a timing diagram for the switch duty cycles for the inverter lower switches 312, 314, and 316 when the command voltage vector $\bar{v}_s^*$ is in the fourth sector 404. The state of the control signal to the lower switch 312 of the first inverter leg is shown at $S_a$. The state of the control signal to the lower switch 314 of the second inverter leg is shown at $S_b$. The state of the control signal to the lower switch 316 of the third inverter leg is shown at $S_c$, which remains at a high state for the entire cycle time $T_{pwm}$. As the signal $S_c$ is at a constant high state, the third leg, lower switch 316 remains at a same state, e.g. in the on state, for the entire cycle time $T_{pwm}$. Accordingly, the inverter is more efficient as it does not change state of inverter switch 316 for the fourth sector 404 calculated duty cycle of the inverter.

Figure 10A:
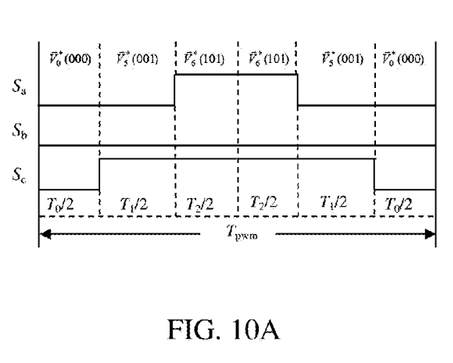
FIGS. 10A and 10B are timing diagrams for controlling inverter upper switches and inverter lower switches, respectively, as calculated for a fifth sector using a discontinuous pulse width modulation technique according to embodiments described herein.

FIG. 10A shows a timing diagram for the switch duty cycles for the upper switches when the command voltage vector $\bar{v}_s^*$ is in the fifth sector 405. The state of the control signal to the upper switch 311 of the first inverter leg is shown at $S_a$. The state of the control signal to the upper switch 313 of the second inverter leg is shown at $S_b$, which remains at a low state for the entire cycle time $T_{pwm}$. The state of the control signal to the upper switch 315 of the third inverter leg is shown at $S_c$. As the signal $S_b$ is at a constant low state, the first leg, upper switch 313 remains at a same state (e.g., in the off state) for the entire cycle time $T_{pwm}$. Accordingly, the inverter is more efficient as it does not change state of inverter switch 313 for the fifth sector 405 calculated duty cycle of the inverter.

Figure 10B:
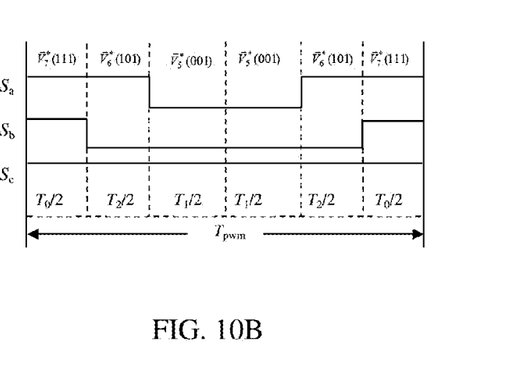

FIG. 10B shows a timing diagram for the switch duty cycles for the inverter lower switches 312, 314, and 316 when the command voltage vector $\bar{v}_s^*$ is in the fifth sector 405. The state of the control signal to the lower switch 312 of the first inverter leg is shown at $S_a$. The state of the control signal to the lower switch 314 of the second inverter leg is shown at $S_b$. The state of the control signal to the lower switch 316 of the third inverter leg is shown at $S_c$, which remains at a high state for the entire cycle time $T_{pwm}$. As the signal $S_c$ is at a constant high state, the third leg, lower switch 316 remains at a same state, e.g. in the on state, for the entire cycle time $T_{pwm}$. Accordingly, the inverter is more efficient as it does not change state of inverter switch 316 for the fifth sector 405 calculated duty cycle of the inverter.

Figure 11A:
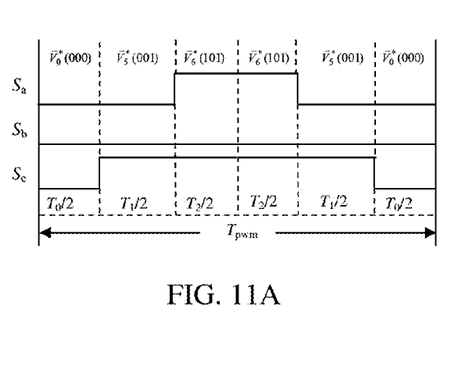
FIGS. 11A and 11B are timing diagrams for controlling inverter upper switches and inverter lower switches, respectively, as calculated for a sixth sector using a discontinuous pulse width modulation technique according to embodiments described herein.

FIG. 11A shows a timing diagram for the switch duty cycles for the upper switches when the command voltage vector $\bar{v}_s^*$ is in the sixth sector 406. The state of the control signal to the upper switch 311 of the first inverter leg is shown at $S_a$. The state of the control signal to the upper switch 313 of the second inverter leg is shown at $S_b$, which remains at a low state for the entire cycle time $T_{pwm}$. The state of the control signal to the upper switch 315 of the third inverter leg is shown at $S_c$. As the signal $S_b$ is at a constant low state, the first leg, upper switch 313 remains at a same state (e.g., in the off state) for the entire cycle time $T_{pwm}$. Accordingly, the inverter is more efficient as it does not change state of inverter switch 313 for the sixth sector 406 calculated duty cycle of the inverter.

Figure 11B:
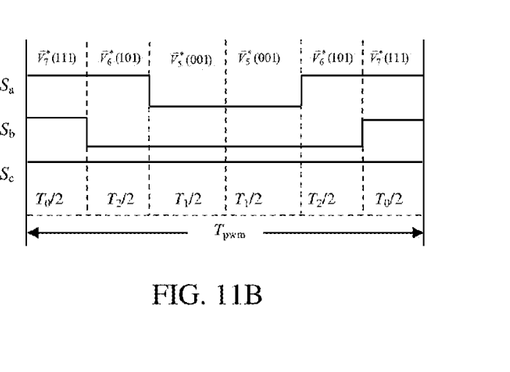

FIG. 11B shows a timing diagram for the switch duty cycles for the inverter lower switches 312, 314, and 316 when the command voltage vector $\bar{v}_s^*$ is in the sixth sector 406. The state of the control signal to the lower switch 312 of the first inverter leg is shown at $S_a$. The state of the control signal to the lower switch 314 of the second inverter leg is shown at $S_b$, which remains at a low state for the entire cycle time $T_{pwm}$. The state of the control signal to the lower switch 316 of the third inverter leg is shown at $S_c$, which remains at a high state for the entire cycle time $T_{pwm}$. The third leg, lower switch 316 remains at a same state, e.g. in the "on" state, for the entire cycle time $T_{pwm}$. Accordingly, the inverter is more efficient as it does not change state of inverter switch 316 for the sixth sector 406 calculated duty cycle of the inverter.

Figure 12:
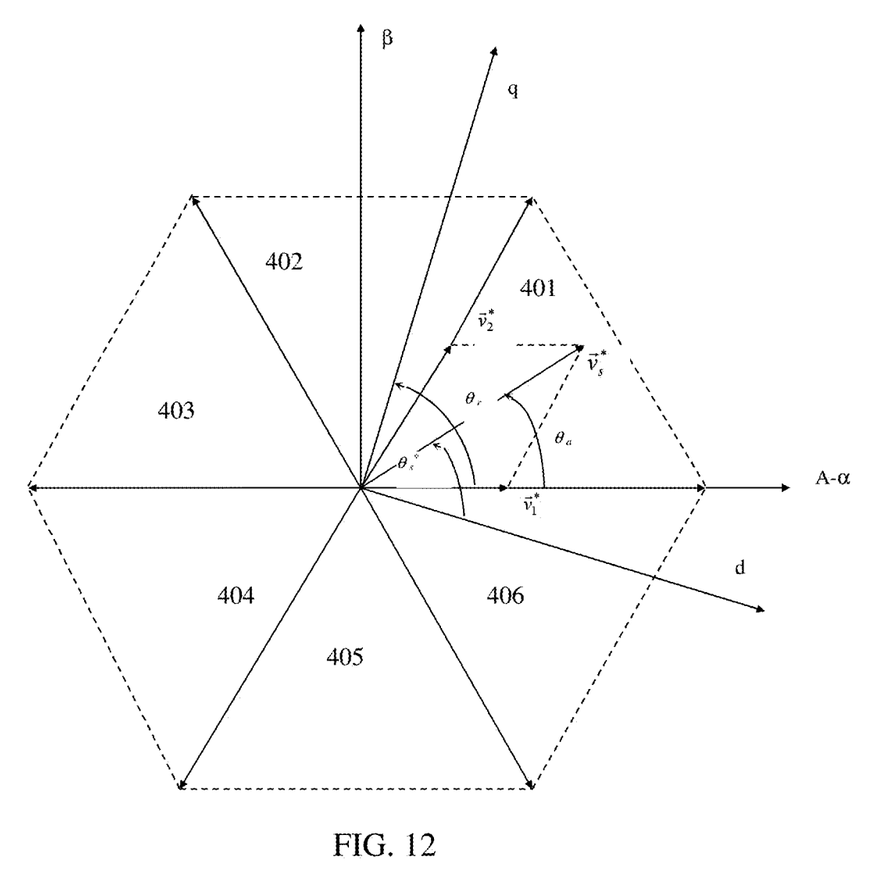
FIG. 12 is a voltage vector decomposition diagram showing a representation of the relationships used to calculate the duty cycles of FIGS. 6-11.

FIG. 12 shows voltage vector decomposition for use in calculating the duty cycles for the inverter switches. The relationships of the variables shown in FIG. 12 can be used on the power electronics module, the inverter, or a Discontinuous PWM Generation Module (FIG. 13) to generate internal values for calculation of the inverter switch duty cycles for a commanded voltage vector. $\theta_s^*$ is the angle of commanded voltage vector with respect to d-axis. $\theta_r$ is the rotor position. $\theta_a$ is the angle of the command vector from the active vector and be can be calculated from $\theta_s^*$ and $\theta_r$.

Figure 13:
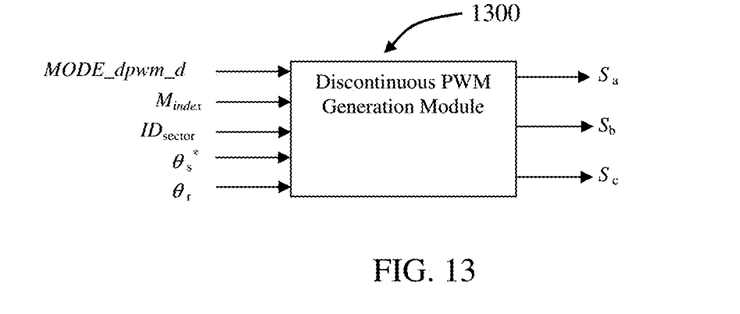
FIG. 13 shows a computing device that computes the switch control signals using a digital pulse width modulation technique according to embodiments described herein.

FIG. 13 shows a PWM Generation module 1300 that can receive inputs and calculate the control signals for the switches of the inverter. PWM Generation module 1300 can include circuitry that can store digital data and perform mathematical calculations. In an example, PWM Generation module 1300 performs discontinuous pulse width modulation using only one of the zero voltage vectors such that at least one of the control signals to one switch of the upper group of switches 311, 313, 315 and one switch of the lower group of switches 312, 314, 316 in a same state. The PWM Generation module 1300 receives a mode selection signal MODE_dpwm_d that indicates whether the module is computing a control signal using discontinuous PWM algorithms, e.g., for the upper or lower group of switches; a modulation index signal $M_{index}$ that represents the expected voltage amplitude; a sector indication signal $ID_{sector}$ that indicates the sector on the voltage vector plane in which the calculations are taking place; $\theta_s^*$, and $\theta_r$. PWM Generation module 1300 can compute and use internally the angle of the commanded voltage vector with respect to the first active vector $\theta_a$ and the duty cycles of the zero vector, first active vector, and second active vector for the current sector. The PWM Generation module 1300 can store a sin operation calculation table to speed calculations of the sin operation when used internally, e.g., in the method described below in conjunction with FIG. 15. Module 1300 can use the table to look up solutions to the sin operation in place of calculating the solution.

The pulse width modulation generation module 1300 can also receive further inputs including, but not limited to, input signals, noise factor, and control factors. Pulse width modulation generation module 1300 can output functional outputs. Input signals can include the pulse width modulation cycle period, the electric motor's rotor position or angle, the DC bus voltage, which can be the output from the battery 114, a d-axis voltage command, and a q-axis voltage command. The noise factors 1405 can include piece-to-piece noise, change over time noise, customer usage noise, external environment noise, and system interaction noise. These noise factors can be stored and used to correct for their effects on the calculation outputs. The outputs from pulse width modulation generation module 1300 can include a symmetric three phase control signals to provide symmetric three-phase current to the electrical motor from the DC power source. In view of the improved calculation by the pulse width modulation generation module 1300, e.g., using a single zero vector per sector and storing sin values in the module, the module 1300 can provide a fast dynamic current response, low total harmonic distortion, smooth pulse width modulation mode and reduced sideband noise.

Figure 14:
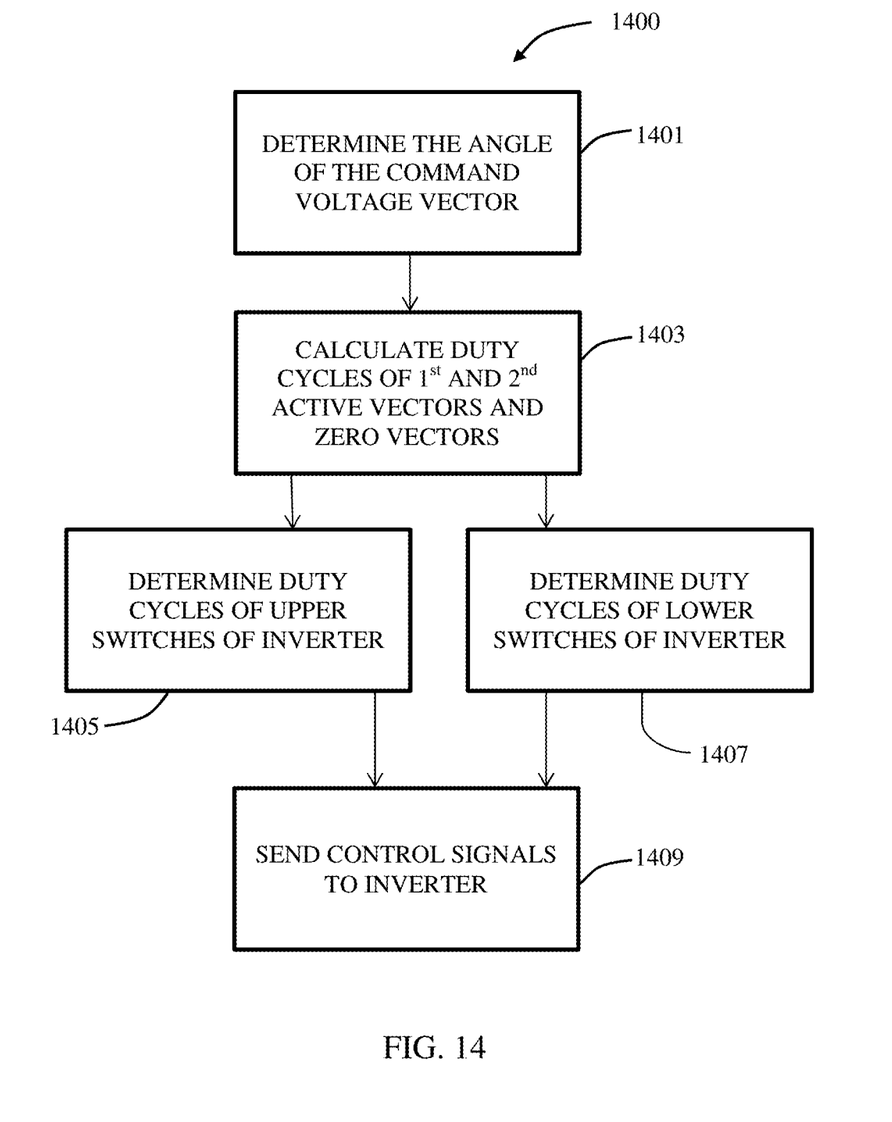
FIG. 14 is a discontinuous pulse width modulation method.

FIG. 14 shows a discontinuous pulse width modulation method 1400 that is used to calculate the duty cycles for use in the inverter to allow electrical power to transfer between the battery 114 and electric motor 104. The method can be performed by the PWM Generation module 1300, the controller 303, the power electronics module 116 or combinations thereof. The method as described herein is used to achieve as close as possible the commanded voltage to drive the electric motor to provide vehicle performance as required by the user and/or as set by the vehicle. At 1401, the angle of the target voltage with respect to the first active vector is calculated. With reference to FIGS. 4 and 12 embodiments, the target voltage is $\bar{V}_s^*$ and is in the first sector; accordingly, the angle of the target voltage is measured to first active voltage vector. At 1403, the duty cycles of the first and second active vectors and the zero vectors are calculated. In an example, these can be calculated by the following:

$$\theta_a = \theta_r + \theta_s^* - \frac{\pi}{2} - (ID_{sector} - 1)\frac{\pi}{3}$$

Then, the method can determine or fetch from a stored table, e.g., the table stored in PWM Generation module 1300, the values of $\sin \theta_a$ and $$\sin\left(\frac{\pi}{3} - \theta_a\right).$$

Then the duty cycles are calculated as $$\sigma_1 = \frac{2\sqrt{3}}{\pi} M_{index} \sin\left(\frac{\pi}{3} - \theta_a\right)$$

$$\sigma_2 = \frac{2\sqrt{3}}{\pi} M_{index} \sin\theta_a$$

$$\sigma_0 = 1 - \sigma_1 - \sigma_2$$

At 1405, the duty cycles of the group of upper switches is calculated as follows:

| $ID_{sector} = 1$ | $ID_{sector} = 2$ | $ID_{sector} = 3$ | $ID_{sector} = 4$ |
|---|---|---|---|
| $S_a = \sigma_1 + \sigma_2$ | $S_a = \sigma_1$ | $S_a = 0$ | $S_a = 0$ |
| $S_b = \sigma_2$ | $S_b = \sigma_2 + \sigma_2$ | $S_b = \sigma_2 + \sigma_2$ | $S_b = \sigma_1$ |
| $S_c = 0$ | $S_c = \sigma_0$ | $S_c = \sigma_2$ | $S_c = \sigma_1 + \sigma_2$ |

| $ID_{sector} = 5$ | $ID_{sector} = 6$ |
|---|---|
| $S_a = \sigma_2$ | $S_a = \sigma_1 + \sigma_2$ |
| $S_b = 0$ | $S_b = 0$ |
| $S_c = \sigma_1 + \sigma_2$ | $S_c = \sigma_1$ |

At 1407, the duty cycles of the group of lower switches is calculated as follows:

| $ID_{sector} = 1$ | $ID_{sector} = 2$ | $ID_{sector} = 3$ | $ID_{sector} = 4$ |
|---|---|---|---|
| $S_a = 1$ | $S_a = \sigma_0 + \sigma_1$ | $S_a = \sigma_0$ | $S_a = \sigma_0$ |
| $S_b = \sigma_0 + \sigma_2$ | $S_b = 1$ | $S_b = 1$ | $S_b = \sigma_0 + \sigma_1$ |
| $S_c = \sigma_0$ | $S_c = \sigma_0$ | $S_c = \sigma_0 + \sigma_2$ | $S_c = 1$ |

| $ID_{sector} = 5$ | $ID_{sector} = 6$ |
|---|---|
| $S_a = \sigma_0 + \sigma_2$ | $S_a = 1$ |
| $S_b = \sigma_0$ | $S_b = \sigma_0$ |
| $S_c = 1$ | $S_c = \sigma_0 + \sigma_1$ |

As can be seen from the above computations at least one switch is in steady state, i.e., either has a zero value or one set value and, hence, reduces the switching losses. The other values will vary over the pulse cycle time, e.g., the other values vary to produce the control signals to the inverter to produce the AC signal to the electric motor.

At 1409, the control signals $S_a$, $S_b$ and $S_c$ are sent to the inverter and in an example, to the gates of the switches to control the flow of electrical energy through the switches from the battery to the electric motor.

The above method may be embodied in machine instructions that can be stored in a machine readable form, e.g., in a tangible media. A machine-readable medium may be a single medium, the phrase "machine-readable medium" should be taken to include a single medium or multiple media (e.g., a centralized or distributed database, and/or associated caches and servers) that store the one or more sets or subsets of instructions. The phrase "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and receivable carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects that execute instructions, firmware, and combinations thereof, as appropriate for particular implementations of various embodiments.

The present disclosure using the term "calculate" and terms of similar import. It will be understood that the term calculate can include approximation calculations as well as precise calculations with regard to the present systems and methods.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Although various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle discontinuous PWM method comprising:
   outputting a voltage-command to control an electric motor using two adjacent active vectors and a single zero-vector associated with the two active vectors, and to include a vector angle that is proportional to a sum of rotor position and an output of a commanded vector angle and a sector dependent parameter; and
   alternating the single zero-vector for calculating the voltage-command for subsequent adjacent active vectors of an adjacent sector.

2. The method of claim 1, wherein outputting includes calculating a first active vector duty cycle for a first of the two adjacent active vectors, calculating a second active vector duty cycle for a second of the two adjacent active vectors, calculating a single zero vector duty cycle for the single zero-vector, and converting the first active vector duty cycle, the second active vector duty cycle and the zero vector duty cycle to control duty cycles of three upper switches of an inverter, respectively.

3. The method of claim 2, wherein outputting includes calculating a third active vector duty cycle for the first adjacent active vector, calculating a fourth active vector duty cycle for the second active vector, calculating a single, second zero-vector duty cycle for a second single zero vector, and converting the third active vector duty cycle, the fourth active vector duty cycle and the second zero vector duty cycle to control duty cycles of three lower switches of the inverter, respectively.

4. A discontinuous pulse width modulation method for a vehicle, the method comprising:
   receiving an angle of a motor-drive commanded vector to drive an electric motor; and
   outputting first duty cycles based on two active vectors and a single zero vector in a sector, and control signals for an upper group of inverter switches and a lower group of inverter switches using the first duty cycles, wherein at least one of the control signals for the sector is held constant,
   wherein outputting calculates a command voltage vector angle $\theta_a$ relative to the active voltage vector of a sector of a voltage vector plane using $$\theta_a = \theta_r + \theta_s^* - \frac{\pi}{2} - (ID_{sector} - 1)\frac{\pi}{3}.$$

5. The method of claim 4, wherein outputting includes holding one of the control signals for the upper group of inverter switches constant.

6. The method of claim 5, wherein outputting includes holding one of the control signals for the lower group of inverter switches constant.

7. The method of claim 4, wherein the single zero vector alternates on a sector basis.

8. The method of claim 7, wherein the single zero vector is selected from two zero vectors and wherein a first vector of the two zero vectors is used with calculating in a first sector for the upper group of inverter switches and a second vector of the two zero vectors is used with calculating in the first sector for the lower group of inverter switches.

9. The method of claim 8, wherein outputting includes holding constant one of the control signals for the upper group of inverter switches and wherein outputting includes holding constant one of the control signals for the lower group of inverter switches such that one switch of both the upper group and the lower group do not switch during one duty cycle.

10. A vehicle comprising:
    a battery;
    an electrical motor to be powered by the battery;
    inverter circuitry to convert a DC signal of the battery to an AC signal of the electric motor, the inverter circuitry including three legs that include two series connected switches and a node intermediate the two switches connected to the electrical motor; and
    a controller to output a state signal for the inverter circuitry in response to a target command voltage for the electric motor, wherein the inverter circuitry in response to the state signal holds at least one switch in a constant state throughout a duty cycle,
    wherein the controller calculates an angle of a command voltage vector $\theta_a$ relative to the active voltage vector of a sector of the voltage vector plane using $$\theta_a = \theta_r + \theta_s^* - \frac{\pi}{2} - (ID_{sector} - 1)\frac{\pi}{3}.$$

11. The vehicle of claim 10, wherein the inverter circuitry defines a six sector voltage vector plane with six active voltage vectors ($\vec{V}_1, \vec{V}_2, \vec{V}_3, \vec{V}_4, \vec{V}_5, \vec{V}_6$) defining the six sectors and two zero voltage vectors ($\vec{V}_0, \vec{V}_7$) for use in the controller to control state of the inverter circuitry and electrical signals from the battery to the electrical motor.

12. The vehicle of claim 11, wherein at least one switch in each leg is held at a constant state for a duty cycle to reduce switching losses.

13. The vehicle of claim 10, wherein the controller calculates internal duty cycle variables using $$\sigma_1 = \frac{2\sqrt{3}}{\pi} M_{index} \sin\left(\frac{\pi}{3} - \theta_a\right)$$

$$\sigma_2 = \frac{2\sqrt{3}}{\pi} M_{index} \sin\theta_a$$

$$\sigma_0 = 1 - \sigma_1 - \sigma_2.$$

14. The vehicle of claim 13, wherein the controller calculates inverter switch control signals from $\sigma_1, \sigma_2,$ and $\sigma_0.$ 15. The vehicle of claim 14, wherein the controller outputs a control signal to the switches of the inverter and wherein at least one control signal is equal to one of $\sigma_1, \sigma_2,$ and $\sigma_0.$ 16. The method of claim 1, wherein outputting includes:
    outputting first duty cycles based on two active vectors and a single zero-vector in a sector, and control signals for an upper group of inverter switches and a lower group of inverter switches using the first duty cycles,
    holding one of the control signals for the upper group of inverter switches constant, holding one of the control signals for the lower group of inverter switches constant, and wherein the single zero-vector alternates on a sector basis.

17. The method of claim 16, wherein the single zero-vector is selected from two zero-vectors and wherein a first vector of the two zero-vectors is used with calculating in a first sector for the upper group of inverter switches and a second vector of the two zero-vectors is used with calculating in the first sector for the lower group of inverter switches; and wherein outputting includes holding constant one of the control signals for the upper group of inverter switches and wherein outputting includes holding constant one of the control signals for the lower group of inverter switches such that one switch of both the upper group and the lower group do not switch during one duty cycle.

18. The method of claim 1, wherein outputting includes calculating and internal duty cycle variables using $$\sigma_1 = \frac{2\sqrt{3}}{\pi} M_{index} \sin\left(\frac{\pi}{3} - \theta_a\right)$$

$$\sigma_2 = \frac{2\sqrt{3}}{\pi} M_{index} \sin\theta_a$$

$$\sigma_0 = 1 - \sigma_1 - \sigma_2.$$

19. The method of claim 18, wherein outputting includes calculating inverter switch control signals from $\sigma_1$, $\sigma_2$, and $\sigma_0$; and outputting a control signal to the switches of the inverter and wherein at least one control signal is equal to one of $\sigma_1$, $\sigma_2$, and $\sigma_0$.

20. The method of claim 1, wherein vector angle ($\theta_a$) is computed using $$\theta_a = \theta_r + \theta_s^* - \frac{\pi}{2} - (ID_{sector} - 1)\frac{\pi}{3}.$$

* * * * *